United States Patent [19]
Linder et al.

[11] Patent Number: 4,831,986
[45] Date of Patent: May 23, 1989

[54] FUEL INJECTION PUMP

[75] Inventors: Ernst Linder, Muhlacker; Helmut Rembold, Stuttgart; Walter Schlagmueller, Schwieberdingen, all of Fed. Rep. of Germany

[73] Assignee: Robert Bosch GmbH, Stuttgart, Fed. Rep. of Germany

[21] Appl. No.: 195,319

[22] Filed: May 18, 1988

[30] Foreign Application Priority Data

Jul. 4, 1987 [DE] Fed. Rep. of Germany ....... 3722151

[51] Int. Cl.$^4$ ............................................. F02M 39/00
[52] U.S. Cl. .................................... 123/449; 123/458; 123/300
[58] Field of Search ............... 123/449, 503, 501, 502, 123/299, 300, 458, 451; 417/515, 525

[56] References Cited

U.S. PATENT DOCUMENTS

| | | | |
|---|---|---|---|
| 2,227,127 | 12/1940 | Pillstrom | 123/451 |
| 2,326,958 | 8/1943 | Marais | 417/515 |
| 2,521,119 | 9/1950 | Green | 123/451 |
| 3,220,394 | 11/1965 | Berlyn | 123/449 |
| 4,590,904 | 5/1986 | Wannenwetsch | 123/300 |
| 4,612,905 | 9/1986 | Dietrich | 123/300 |
| 4,693,227 | 9/1987 | Satou | 123/300 |
| 4,697,565 | 10/1987 | Kobayashi | 123/449 |
| 4,700,672 | 10/1987 | Baguena | 123/299 |

Primary Examiner—Carl Stuart Miller
Attorney, Agent, or Firm—Edwin E. Greigg

[57] ABSTRACT

A fuel injection pump, preferably for internal combustion engines operating by the Otto method, having a pump work piston driven to reciprocate and rotate simultaneously and defining two mutually independent pump work chambers, is proposed. The first pump work chamber pumps fuel into the combustion chamber of the engine that is in a state immediately prior to ignition, while the second pump work chamber pumps fuel into the combustion chamber operating offset from the other by 360° crankshaft angle. To this end, two distributor openings are disposed in the jacket face of the pump work piston, offset by 180° from one another and each communicating with a different one of the pump work chambers.

20 Claims, 2 Drawing Sheets

FUEL INJECTION PUMP

BACKGROUND OF THE INVENTION

The invention is based on a fuel injection pump as defined herein. A fuel injection pump operating on the distributor principle that can also be used for direct injection in internal combustion engines having externally supplied ignition (Otto method) is already known. The fuel, furnished at feed pressure by a work piston, is distributed to the individual injection valves by a distributor shaft that rotates at half the crankshaft speed. This known pump is arranged such that at virtually the same time as the main injection that immediately precedes the ignition, a pre-injection into the working cylinder that operates offset by 360° of crankshaft angle is performed. The quantity for the pre-injection is less than that for the main injection.

A disadvantage of the known pump is that both the total fuel quantity injected and the ratio of the pre-injection and main injection quantities are invariable. Nor can the onset and end of supply be varied during operation in the known apparatus. Especially from the standpoint of a sophisticated control of fuel quantity, the known fuel injection pump is unusable, because the pre-injection and main injection mutually influence one another, causing insurmountable problems in fuel quantity distribution. Hydraulic pressure waves also make accurate fuel metering impossible.

OBJECT AND SUMMARY OF THE INVENTION

The fuel injection pump according to the invention has an advantage over the prior art in that the pre-injection and main injection are performed independently of one another and so cannot influence on another. A single pump work piston generates the fuel feed pressure and distributes the pre-injection and main injection quantities to the individual injection valves.

It is particularly advantageous to limit the pre-injection and main injection by opening relief conduits by means of electrically actuatable valves and in this way to adapt the injected fuel quantity to the operating state of the engine at the time.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
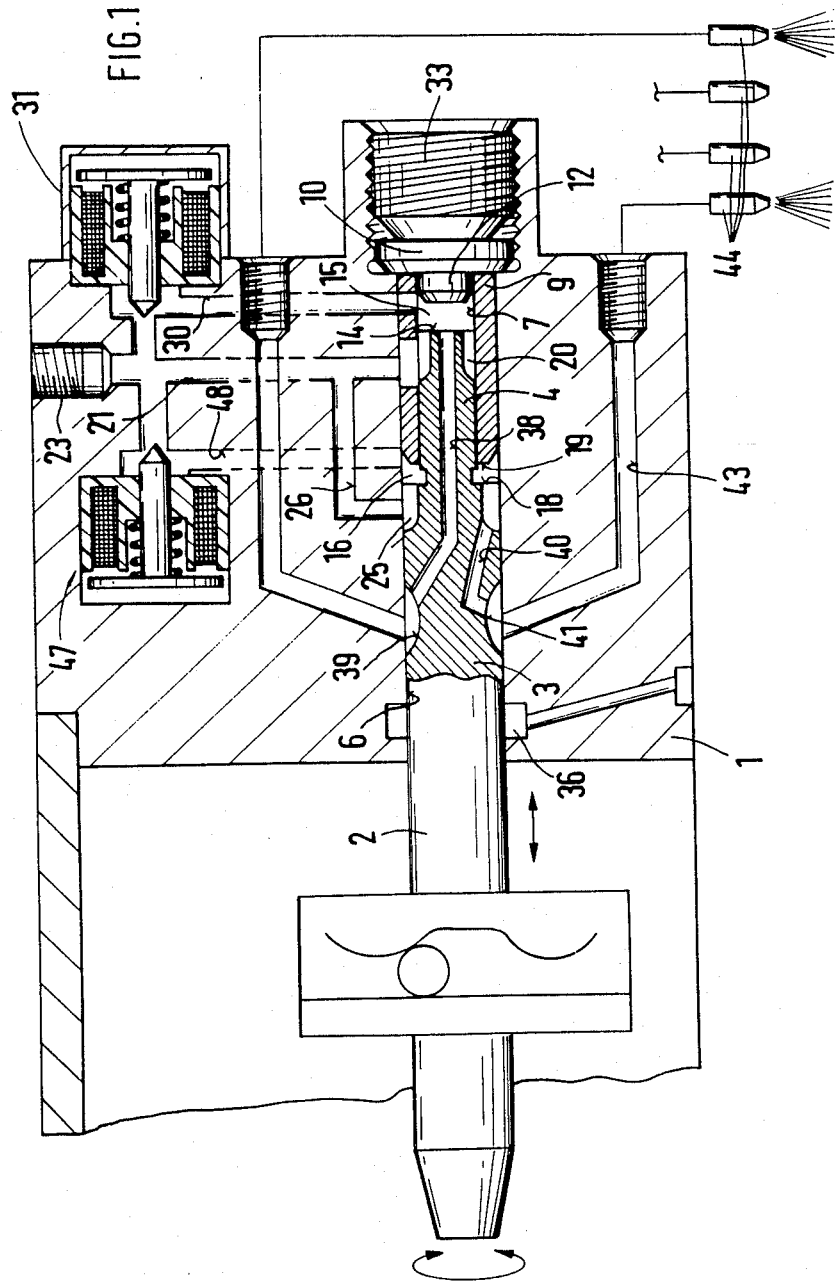
FIGS. 1 and 2 each show details of a fuel injection pump.

In the fuel injection pump shown in FIG. 1, a pump work piston 2, which executes a simultaneously reciprocating and rotating motion, is disposed in a housing 1. The pump work piston 2 is driven in a manner known per se by a cam drive via a shaft that rotates in synchronism with the rpm of the internal combustion engine supplied with fuel by this pump. In the caseof supply to a 4-stroke engine, the pump work piston rotates at half the rotational speed of the crankshaft. The pump work piston 2 comprises a first cylindrical section 3 of larger diameter and adjoining it a second cylindrical section 4 of smaller diameter. While the first cylindrical section 3 is guided in a guide bore 6 of the housing 1, the second cylindrical section 4 of the pump work piston 2 slides in a coaxial central bore 7 of a sleeve 9, which extends into the bore 6 of the housing the circumferential surface of which is pressed into the guide bore 6 for a portion of its length. The sleeve 9 is closed off from the outside by a stopper 10, serving as a closure element, which has a cylindrical body 12 of the same diameter as the central bore 7 of sleeve 9 and which protrudes partway into the cylindrical bore 7 and closes it at one end. The cylindrical body 12 serves to expand the sleeve 9 and clamp it inside the guide bore 6. Extending between the cylindrical body 12 of the stopper 10 and an end face 14 of the pump work piston 2 is a first pump work chamber 15 in the form of a cylinder, the size of which depends on the axial position of the pump work piston 2. A second pump work chamber 16 in the form of an annular space extends between the face 18, forming the transition from the first cylindrical section 3 to the second cylindrical section 4, and the inner face end 19 of the sleeve 9. The size of the second pump work chamber 16 also depends on the axial position of the pump work piston 2 relative to the housing 1. During the intake stroke of the pump work piston 2, the first pump work chamber 16 communicates via a fill groove 20 in the upper end jacket face of the pump work piston 2 with a fuel supply line 21 which discharges laterally of the pump work piston 2 into the first pump work chamber 15. The line 21 communicates via a pressure connection 23 with a fuel supply source, not shown. While the aforementioned fill grooves 20 serve to supply fuel to the first pump work chamber 15, further identically embodied fill grooves 25 are located in the first cylindrical section 3 of the pump work piston 2, opening into the second pump work chamber 16 and serving to fill it with fuel. To this end, the further fill grooves 25 are likewise connectable with the fuel supply source, via a fuel conduit 26 which connects with fuel supply line 21.

A relief conduit 30 located in the housing 1 discharges at one end into the first pump work chamber 15 and at the other into the fuel distributor line 21 and is closable by means of an electrically controllable valve 31, for example a magnetic valve.

The stopper 10, which is centered in the central bore 7 of the sleeve 9 by means of its cylindrical body 12, is axially secured by a fastener 33, for example, in the form of a screw connection structurally connected to the housing.

If the fuel injection pump according to the invention is used for feeding fuel to Otto engines it is advantageous to provide an encompassing collecting groove 36 in the region of the guide bore 6 remote from the stopper 10 so as to collect leaking fuel and suitably return it to the fuel supply source by a suitable return line, not shown.

Two connecting conduits 38 and 40 are machined into the pump work piston 2. The first connecting conduit 38 discharges at one end into the first pump work chamber 15 and at the other end into a first distributor opening 39, for instance in the form of a longitudinally extending circumferential groove, which is machined into the circumference of the first cylindrical section 3 of the pump work piston 2. The second connecting conduit 40 discharges at one end into the second pump work chamber 16 and at the other end opens into a second distributor opening 41, which is offset by 180° from and over the same axial length as the first distributor opening 39. Inflow lines 43 only two of which are shown, which lead to the injection valves 44 to supply the various combustion chambers of the engine, are machined into the housing 1. The inflow lines 43, each offset by the same angle from one another, discharge into the guide bore 6, in the region swept by the distributor openings 39, 41, so that upon each complete rotation of the pump work piston 2, each of the distributor openings 39, 41 enters communication once with each of the inflow lines 43. The fuel injection pump shown in the drawing, for a four-cylinder, four-stroke internal combustion engine, has four inflow lines 43, which discharge into the guide bore 6 offset from one another by 90° each. However, the invention is also applicable to engines having some other number of cylinders, as will be demonstrated hereinafter.

Besides the electrically controllable valve 31, the fuel injection pump has a further electrically controllable valve 47, again preferably a magnetic valve, which in its closed position closes off an additional relief conduit 48 that at one end discharges into the second pump work chamber 16 and at the other leads to the fuel supply source. Both electrically controllable valves 31, 47 are actuated by an electronic control unit as a function of engine operating parameters.

The fuel injection pump described above functions as follows:

At a corresponding rotational position of the pump work piston 2 and via the fill grooves 20 and 25 respectively, the pump work chambers 15 and 16 fill with fuel at whatever pressure is generated and maintained by the fuel supply source. The size of the pump work chambers 15, 16 is maximal at that time. If the pump work piston 2 moves in the direction of a decrease in size of the pump work chambers 15, 16, which happens by closing of the fill grooves 20, 25 in the course of the simultaneous rotational movement of the pump work piston 2, then the fuel is pumped out of the respective pump work chambers 15 and 16, via the respective connecting conduits 38 and 40, to the respective distributor openings 39 and 41, from whence the fuel then, via the associated inflow lines, reaches two of the injection valves 44. The above-described fuel feeding is ended whenever either the pump work piston 2 reaches its final position, or the electrically controllable valves 31, 47 open. By actuation of the electrically controllable valve 31, the relief conduit 30 is opened, so that the fuel located in the first pump work chamber 15 can flow out without attaining injection. The further electrically controllable valve 47 which operates in the same manner, causes the additional relief conduit 48 to be opened, so that fuel can flow out of the second pump work chamber 16. The onset and end of supply by the fuel injection pump can thus be defined by suitable switching of the electrically controllable valves 31, 47.

On the condition that the fuel quantity pumped through the first pump work chamber 15 effects the main injection, or in other words supplies the fuel that enters the combustion chamber immediately prior to the ignition of the mixture, then the fuel pumped through the second pump work chamber 16 is delivered to the particular engine cylinder that functions offset by 360° of crankshaft angle, or 180° of pump work piston angle, to it. The fuel quantity pumped by the second pump work chamber 16 accordingly is used for the pre-injection, and in a four-stroke Otto engine reaches the work cylinder at the instant of the load change (that is, the closure of the outlet valve and opening of the inlet valve). Naturally, the second pump work chamber 16 can instead perform the main injection and the first work chamber 15 the pre-injection.

For optimal mixture formation, it is advantageous for the pre-injected fuel quantity to be less than the quantity for the main injection, which can be accomplished either by suitable control of the electrically controllable valves 31, 47 or by suitable dimensioning of the pump work chambers 15 16.

The fuel injection pump described enables a pre-injection at 360° of crankshaft angle, in engines having an even number of cylinders. With an uneven number of cylinders (for instance, five), a pre-injection is still possible, but not at the time of the load change. The angle between the distributor openings 39, 41 must be modified accordingly, so that two of the inflow lines 43 at a time are covered by the distributor openings 39, 41.

Figure 2:
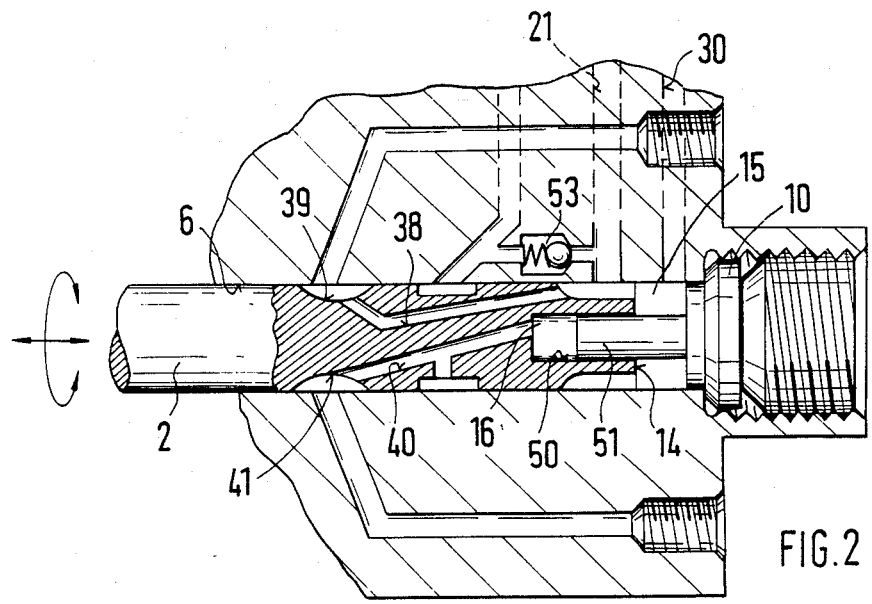

A second exemplary embodiment of the invention is shown in FIG. 2, in which components that function the same as in the first embodiment are identified by the same reference numerals. In contrast to the first exemplary embodiment, the pump work piston 2 is not embodied as a stepped piston; instead its diameter is constant over its entire length. Located in the pump work piston 2, oriented toward the stopper 10, is a blind bore 50, into which a coaxial guide tang 51 that is firmly joined to the stopper 10 protrudes sealingly. The first pump work chamber 15 is defined on one end by the end face 14 of the pump work piston 2 and on the other by the stopper 10 while the second pump work chamber 16 is embodied by the space defined by the guide tang 51 in the blind bore 50. In the manner already described, the first distributor opening 39 communicates with the first pump work chamber 15 via the first connecting conduit 38, and the second distributor opening 41 communicates with the second pump work chamber 16 via the second connecting conduit 40.

A further distinction from the first exemplary embodiment is the type of fuel delivery to the second pump work chamber 16: Instead of the fill grooves, a check valve 53 is used, which is suitably incorporated between the fuel supply line 21 and the second pump work chamber 16 and which allows a flow only in the direction toward the second pump work chamber 16. A check valve and a fill groove function identically to one another, and either component can be used as an alternative.

Figure 3:
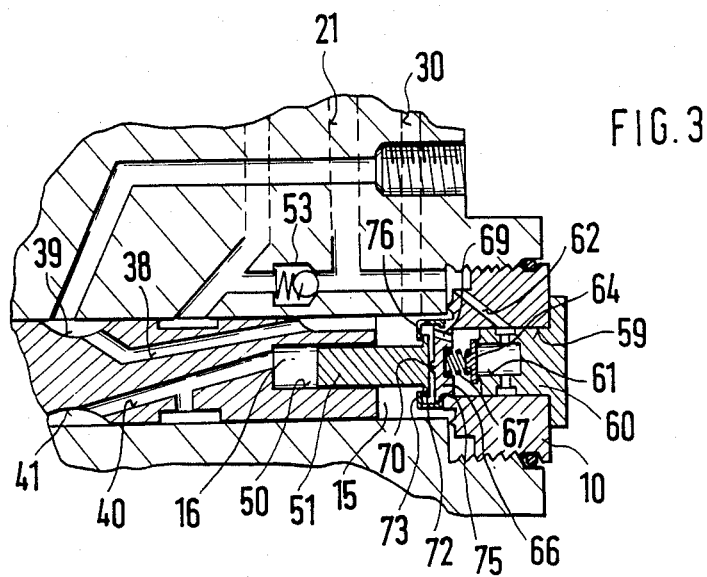
FIG. 3 is a detail of a modified embodiment of the fuel injection pump shown in FIG. 2.

FIG. 3 shows a fuel injection pump similar to the one shown in FIG. 2, but in which the filling of the first pump work chamber 15 is also effected via a check valve. To this end, a valve seat body 60 is located inside a receiving bore 59 of the stopper 10 acting as a closing element. The valve seat body 60 has a blind bore 61 that opens in the direction toward the pump work piston 2. The blind bore 61 communicates via a fill conduit 62 with the fuel supply line 21 and is closable by a plate-like valve body 64, upon which the force of a compression spring 67, supported at the other end on a bottom 66 of the receiving bore 59, is exerted. A connecting opening 69 discharges at one end on the bottom 66 of the receiving bore 59 and on the other into the first pump work chamber 15. The guide tang 51, which in this embodiment is disposed movably rather than rigidly, is supported on a central protrusion 70 of the bottom 66 that protrudes into the first pump work chamber 15. Remote from the pump work piston 2, the primarily cylindrical guide tang 51 terminates in an enlargement in the form of a collar 72, which is encompassed over at least part of its circumference by a retaining bracket 73, which is supported at the other end in an annular groove 75 of the stopper 10. The retaining bracket 73 is provided with suitable flow openings 76.

The guide tang 51 is retained in the axial direction by the retaining bracket 73 on one end and the protrusion 70 in the bottom 66 on the other; to compensate for possible radial play of the guide tang 51 relative to the pump work piston 2 or the stopper 10, the retaining bracket 73 encompasses the collar 72 with play in such a way that compensation for radial movements of the guide tang 59 is possible. This may be necessary, since it is difficult to manufacture the guide tang 59 and the blind bore 50 such that they are centered with respect to one another.

In the exemplary embodiment of FIG. 3, the filling of the first pump work chamber 15 is effected via the check valve, which is embodied by the plate-like valve body 64 closing the blind bore 61 and acted upon by the compression spring 67. Upon a filling movement of the pump work piston 2, the resultant negative pressure in the first pump work chamber 15 draws fuel via the fuel supply line 21 and the fill conduit 62 into the blind bore 61 whence the fuel then flows into the first pump work chamber 15 via the opened check valve and via the connecting opening 69. Contrarily, during the pumping movement of the pump work piston 2, the valve body 64 closes the blind bore 61; fuel can therefore reach the appropriate injection location via the first connecting conduit 38, or can flow out via the controllable relief conduit 30.

Supporting of the guide bore 51 in a manner that allows radial play can be accomplished in some other way instead, for example by fastening the guide tang 51 elastically to the stopper 10. It is also possible to use the guide tang 51 itself as the valve body of the check valve, which cooperates with a valve seat embodied on the stopper 10.

The use of the second electrically controllable valve 47 for relieving the second pump work chamber 16 is not obligatory. It can certainly be omitted, but at a sacrifice of variable control of the fuel quantity and of the instant of the pre-injection.

Effecting pre-injection at the instant of the load change offers the advantage of increasing engine output as compared with a standard, single injection. The pre-injection fuel quantity should be approximately 30 to 40% of the main injection quantity.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection pump for internal combustion engines, comprising a pump work piston, said pump work piston having a pump piston that periodically pumps fuel and a distributor piston rotatable in a guide bore, said distributor piston having distributor openings discharging at its jacket face, which in accordance with a rotational position of said distributor piston during a pumping stroke of said pump piston simultaneously communicate with inflow lines that discharge, offset from one another by a fixed angle, into said guide bore and lead to various fuel injection locations of said engine, said pump work piston (2), is driven to reciprocate and rotate simultaneously, said distribution piston includes faces (14, 18) axially offset from one another and distributor opens (39, 41) therein, said faces (14, 18) define at least two pump work chambers (15, 16) that are independent of one another and communicate with said distributor openings (39, 41), wherein upon each working stroke of the pump work piston (2), one of the pump work chambers (15, 16) supplies one of the fuel injection locations with fuel, and another of the pump work chambers (15, 16) supplies another of the fuel injection locations with fuel whereby the fuel is directed to one of said injection valves.

2. A fuel injection pump as defined by claim 1, which includes first and second pump work chambers (15, 16).

3. A fuel injection pump as defined by claim 2, which includes an electrically controllable valve (31), which controls a relief conduit (20) that at one end leads to a fuel supply source and at the other end discharges into said first pump work chamber (15).

4. A fuel injection pump as defined by claim 3, which includes a check valve (53) disposed between the fuel supply source and said second pump work chamber (16) which permits a fuel flow only in a direction toward said second pump work chamber (16).

5. A fuel injection pump as defined by claim 3, which includes fill grooves (25) machined into said distributor piston, via which grooves, during an intake stroke of said pump work piston (2) and as a function of a rotational angle of said distributor piston, said second pump work chamber (16) communicates with the fuel supply source.

6. A fuel injection pump as defined by claim 4, which includes a second electrically controllable valve (47), which controls an additional relief conduit (48) in which one end of said relief conduit leads to the fuel supply source and at the other end discharges into said second pump work chamber (16).

7. A fuel injection pump as defined by claim 5, which includes a second electrically controllable valve (47), which controls an additional relief conduit (48) in which one end of said relief conduit leads to the fuel supply source and at the other end discharges into said second pump work chamber (16).

8. A fuel injection pump as defined by claim 1, which includes a sleeve (9) fastened in said guide bore (6), and that the pump work piston (2) is embodied as a stepped piston divided into two cylindrical sections (3, 4) of different diameters the first cylindrical section (3) of which slides in the guide bore (6) and the second cylindrical section (4) of which slides in a central bore (7) of the sleeve (9).

9. A fuel injection pump as defined by claim 2, which includes a sleeve (9) fastened in said guide bore (6) and that the pump work piston (2) is embodied as a stepped piston divided into two cylindrical sections (3, 4) of different diameters, the first cylindrical section (3) of which slides in the guide bore (6) and the second cylindrical section (4) of which slides in a central bore (7) of the sleeve (9).

10. A fuel injection pump as defined by claim 3, which includes a sleeve (9) fastened in said guide bore (6), and that the pump work piston (2) is embodied as a stepped piston divided into two cylindrical sections (3, 4) of different diameters, the first cylindrical section (3) of which slides in the guide bore (6) and the second cylindrical section (4) of which slides in a central bore (7) of the sleeve (9).

11. A fuel injection pump as defined by claim 4, which includes a sleeve (9) fastened in said guide bore (6), and that the pump work piston (2) is embodied as a stepped piston divided into two cylindrical sections (3, 4) of different diameters, the first cylindrical section (3) of which slides in the guide bore (6) and the second cylindrical section (4) of which slides in a central bore (7) of the sleeve (9).

12. A fuel injection pump as defined by claim 5, which includes a sleeve (9) fastened in said guide bore (6), and that the pump work piston (2) is embodied as a stepped piston divided into two cylindrical sections (3, 4) of different diameters, the first cylindrical section (3) of which slides in the guide bore (6) and the second cylindrical section (4) of which slides in a central bore (7) of the sleeve (9).

13. A fuel injection pump as defined by claim 6, which includes a sleeve (9) fastened in said guide bore (6), and that the pump work piston (2) is embodied as a stepped piston divided into two cylindrical sections (3, 4) of different diameters, the first cylindrical section (3) of which slides in the guide bore (6) and the second cylindrical section (4) of which slides in a central bore (7) of the sleeve (9).

14. A fuel injection pump as defined by claim 7, which includes a sleeve (9) fastened in said guide bore (6), and that the pump work piston (2) is embodied as a stepped piston divided into two cylindrical sections (3, 4) of different diameters, the first cylindrical section (3) of which slides in the guide bore (6) and the second cylindrical section (4) of which slides in a central bore (7) of the sleeve (9).

15. A fuel injection pump as defined by claim 8, in which said guide bore (6) and said sleeve (9), respectively, are closed by a closing element (10), which with a cylindrical body (12) protrudes partway into said central bore (7) of said sleeve (9).

16. A fuel injection pump as defined by claim 15, in which said closing element (10) is embodied as a stopper, which is axially secured by a fastener (33).

17. A fuel injection pump as defined by claim 1, in which said guide bore (6) is closed by a closing element (10), said closing element (16) is provided with a guide tang (51) that protrudes into said guide bore (6), said guide tang protrudes partway into a blind bore (50) of said pump work piston (2) and there forms a second pump work chamber (16), while a first pump work chamber (15) is formed between the pump work piston (2) and said closing element (10).

18. A fuel injection pump as defined by claim 17 which includes a check valve (60, 64, 67) embodied as part of said closing element (10), by way of which check valve said first pump work chamber (15) can be made to communicate with the fuel supply source during an intake stroke of the pump work piston (2).

19. A fuel injection pump as defined by claim 17, in which said guide tang (51) is supported in a radially movable manner.

20. A fuel injection pump as defined by claim 1, in which said fuel injection locations are located in the combustion chambers of an internal combustion engine having externally supplied ignition.

* * * * *